(No Model.) 2 Sheets—Sheet 1.

G. WESTINGHOUSE, Jr.
CONNECTION FOR RAILWAY BRAKES.

No. 288,388. Patented Nov. 13, 1883.

Witnesses.
J. Snowden Bell.
R. H. Whittlesey

Inventor. George Westinghouse Jr.
By Attorney, George H. Christy

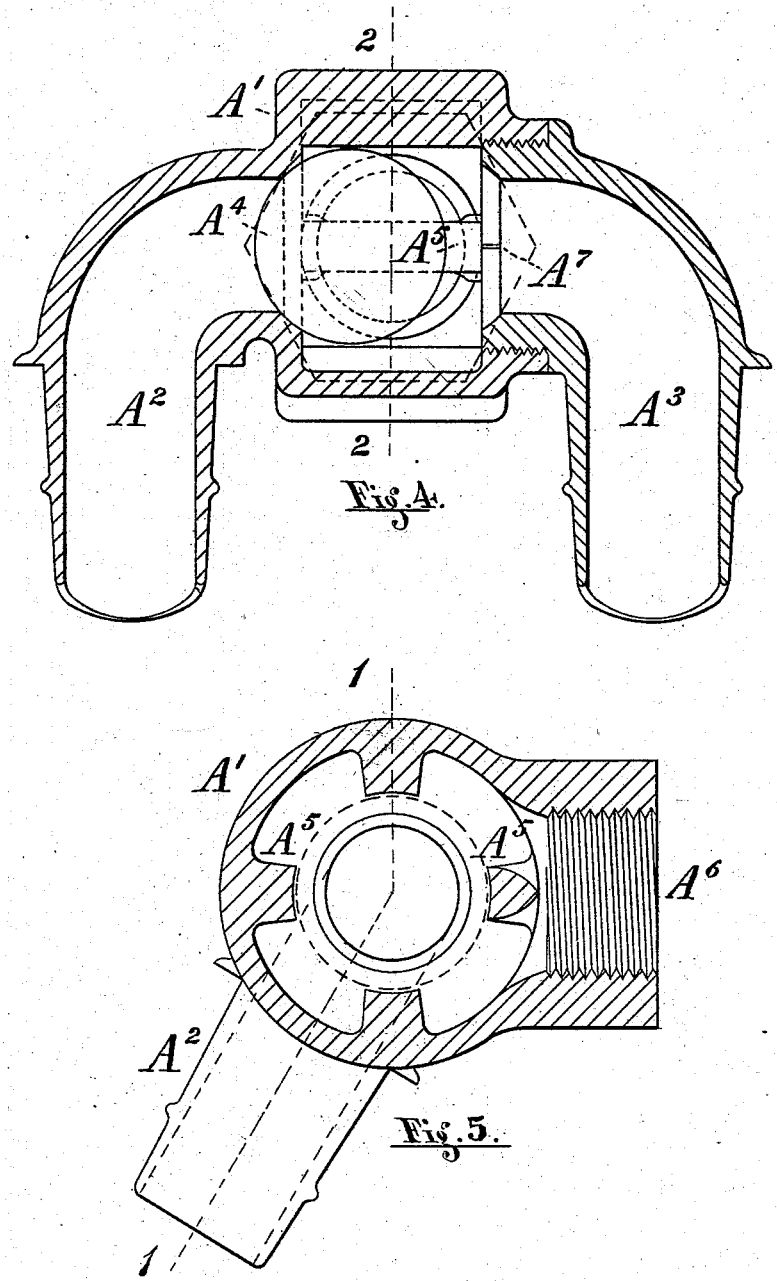

UNITED STATES PATENT OFFICE.

GEORGE WESTINGHOUSE, JR., OF PITTSBURG, PENNSYLVANIA.

CONNECTION FOR RAILWAY-BRAKES.

SPECIFICATION forming part of Letters Patent No. 288,388, dated November 13, 1883.

Application filed September 14, 1883. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a new and useful Improvement in Connections for Railway-Brakes; and I do hereby declare the following to be a full, clear, concise, and exact description thereof, reference being had to the accompanying drawings, making a part of this specification, and in which—like letters indicating like parts—

Figure 1:
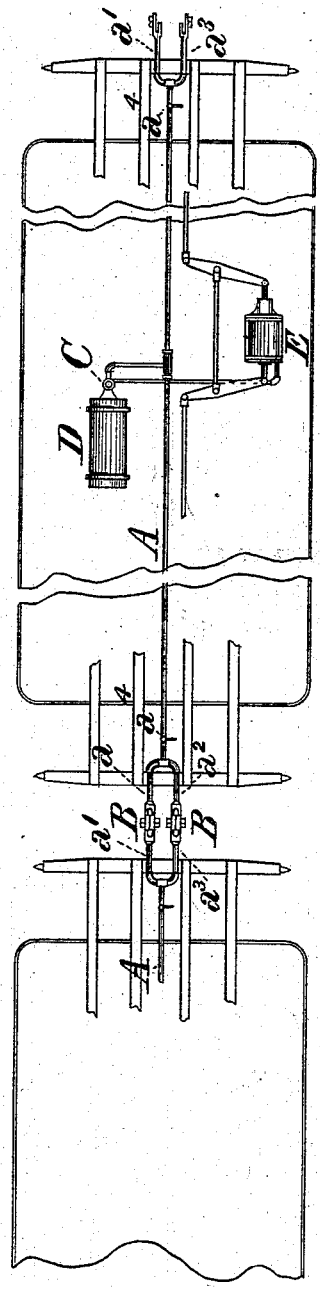
Figure 2:
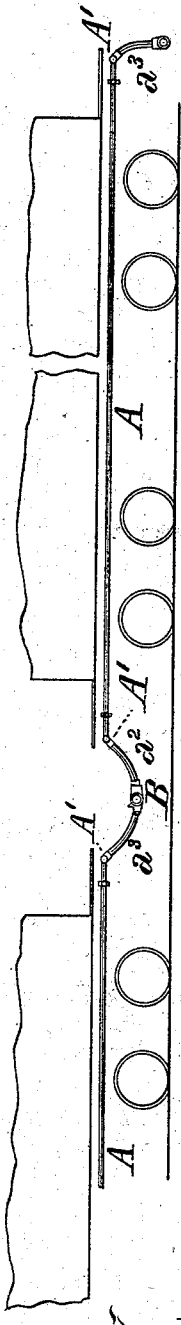
Figure 3:
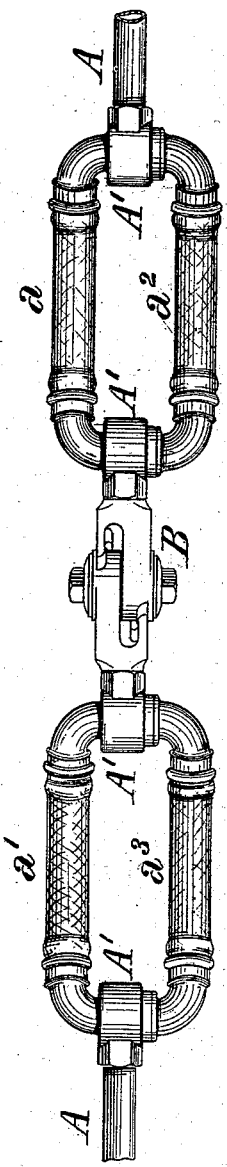

Figure 1, Sheet 1, is an inverted plan view of a railroad-car and portion of another, illustrating my invention as applied in connection with automatic air-brake mechanism; Fig. 2, a side view in elevation of the same; Fig. 3, a plan view on an enlarged scale of a modified form of my improvements; Fig. 4, Sheet 2, a transverse section through the valve-chamber and nipples at the line 1 1 of Fig. 5, and Fig. 5 a longitudinal section through the valve-chamber at the line 2 2 of Fig. 4.

My invention relates to improved means for uniting a series of pipes for conveying fluids, either under compression or when subject to the action of a partial vacuum, in cases where it is necessary or desirable to employ flexible connections between the several members of the series; and my improvements are, among other uses, applicable to continuous brakes of any of the known types, whether automatic or non-automatic, and whether operated by the action of fluid under pressure or by the formation of a vacuum.

It is the object of my invention to effectively prevent interference with the normal operation of mechanism actuated by fluid conveyed through a series of pipes, by the bursting of any one or more of the flexible or hose connections of the pipes, and this I effect by means which are hereinafter set forth.

My invention is of special importance in the class of fluid-pressure brake mechanism technically known as "automatic brakes," one distinguishing characteristic of which is that the application of the brakes is effected by the relief or diminution of pressure in a pipe communicating, through suitable regulating-valves, with auxiliary fluid-pressure reservoirs located, respectively, beneath or on each of the several cars upon which the braking operation is to be performed. The employment of apparatus of such character as heretofore and at present constructed is subject to the objection that the bursting of any one of the hose-connections between the cars causes the brakes to be instantly applied to all the cars of the train. Inasmuch as these connections are exposed to constant and at times severe strains and jars in service, and are composed mainly of material which is subject to deterioration in continued use, liability to their breakage is sometimes to be apprehended, and this may occur so that the resultant application of the brakes will be made at an inopportune moment, and may even, owing to mismanagement or the neglect of proper and ordinary precautions, result in an accident from a too-closely following train. In a non-automatic brake the bursting of a hose disables the braking mechanism of all the cars in the train, and the prevention of such result is in brakes of this description correspondingly important.

My improvements are in this instance shown as applied in connection with an automatic brake of standard construction, the specific details of the mechanism of which will be familiar to those skilled in the art, and which, moreover, do not, except as elements of the combination, form part of my present invention, and need not therefore be herein at length described.

The fluid under pressure, by which the brakes are applied, is transmitted from a reservoir or compressor upon the engine or tender through a line of brake-pipes, A, each located beneath one of the cars and connected one to the other by flexible or hose connections, which are united by suitable couplings, B, adapted to maintain tight joints between the brake-pipes of the adjacent cars while admitting of requisite relative changes of position in passing over the road. An instance of a coupling of such character will be found in Reissued Letters Patent No. 8,291, granted and issued to me under date of June 18, 1878. Each brake-pipe communicates with a regulating-valve, C, of proper construction, usually termed a "triple" valve—as, for example, that of Letters Patent No. 220,556, of October 14, 1879—and this, in turn with an auxiliary pressure-reservoir, D, and a brake-cylinder, E, the piston of which is adapted through the usual intermediate connections, to apply and release the brakes.

In lieu of uniting, as heretofore, the several brake-pipes by single lines of flexible connections, the brake-pipe of each car communicates with that of the adjacent car (or cars, as the case may be,) by a double line of hose $a\ a'$ and $a^2\ a^3$, the members of which are connected to valve apparatus on the ends of the respective pipes, the construction and function of which apparatus is as follows:

Upon each end of the brake-pipe A of each car there is secured a main casting or chamber, A', having a projection or nipple, $A^2$, preferably downwardly bent, to which one of the hose-sections is so attached in the usual manner, and a nipple or projection, $A^3$, similar to the nipple $A^2$, is screwed into the main casting opposite to $A^2$, and serves for the attachment of another section of hose, the space between the upper openings of $A^2$ and $A^3$ forming the chamber of a valve, $A^4$, which is adapted to seat in either of said openings, and is guided so as to move in line therewith by transverse ribs or bars $A^5$. The brake-pipe A is screwed into a threaded passage or nozzle, $A^6$, on the valve-chamber A', which communicates with said chamber between the seats of the valve $A^4$. The hose-sections $a$ and $a^2$ of the valve-chambers at the ends of the brake-pipe A of each car are connected to the sections $a'$ and $a^3$ of the valve-chambers of the adjacent cars, as seen in Fig. 1, the brake-pipes being furnished with the usual stop-cocks, $a^4$, near each of their ends.

Fluid under pressure admitted to the brake-pipes of the train from the compresser or the main reservoir on the engine or tender will enter by the passage $A^6$ of the valve-chamber nearest said compresser or reservoir, and will pass through one or both lines of hose to the next valve-chamber, out of which it will pass through the passage $A^6$ of said chamber into the brake-pipe connected thereto, and so on through the series of pipes, valve-chambers, and hose-connections in the train.

The normal positions of the valves, which, as herein illustrated, are of the ball class, will be resting freely in their chambers between their seats, there being no tendency in the normal operation of the brake mechanism for them to be brought up to or maintained in contact with either of their seats. In the event, however, of the bursting of either section of any one of the lines of hose, as $a\ a'$, Fig. 1, the valves $A^4$ of the adjacent chambers will, by the pressure in the brake-pipes, be instantly closed upon their seats in the direction of the burst hose, thereby leaving a single perfect communication through the opposite line of hose, $a^2\ a^3$. It will thus be seen that, in case a break occurs in either line of hose, the fluid-pressure in the opposite line, by its immediate action in seating the valves in the direction of the break, cuts off the ruptured line, and consequently that the bursting of any hose in the train cannot have the effect of applying the brakes, as the hose of the unbroken line suffices to maintain perfect communication throughout the train, and the operation of the brakes will remain entirely under the control of the engine-man or train-men. The brakes would not, in fact, be applied even in the event of the bursting of a hose between each two cars, for in the use of my improvements the accidental application of the brakes would not occur unless two lines of hose between the same two cars are in a ruptured condition at the same time.

In order to prevent the valve $A^4$ from closing against one of the seats upon the first application of pressure, and thereby closing and keeping closed the line leading from said seat, I provide a small leakage port or passage, $A^7$, formed, preferably, in one of the seats of each valve-chamber, or otherwise, as may be most convenient to establish communication from one side of said seat to the other, and thus to connect the valve-chamber through or past the valve with one of the lines of hose. If the valve by any chance should be pressed up to this seat, a sufficient amount of fluid will leak through the passage $A^7$ into the connected line of hose to charge the same with the full pressure, and the valve will be free between the seats without tendency to close either. The leakage-passage should be made very small, so that in case of the rupture of the hose the leakage or escape therefrom will not be sufficient to cause any inconvenience in the operation of the brake.

When used in connection with pipes in which a partial vacuum is formed, as in the case of "vacuum-brake" apparatus, the valves employed would, in lieu of being of the form shown, be substantially similar to those which are exemplified in the following Letters Patent, to wit: No. 134,408, dated December 31, 1872, (Fig. 2,) reissued February 22, 1876, No. 6,948; No. 124,402, March 5, 1872, and No. 134,177, December 24, 1872.

In the modification shown in Fig. 3 the two lines of hose $a\ a'$ and $a^2\ a^3$ are connected by a single coupling, each section of which is connected to a valve-chamber similar to that hereinbefore described, there being thus four instead of two valve-chambers between each car and the adjacent car, while two separate lines of flexible connections are presented, as before.

In Letters Patent heretofore granted to me there is illustrated a valve apparatus having three connections substantially similar to those shown in Figs. 4 and 5; but such prior apparatus is designed for use in connection with two lines of brake-pipes extending the whole length of the train, to which the side passages are connected, while the middle passage leads to the brake-cylinder. It has been explained in the patent referred to that the bursting of a connection in one line of brake-pipes would automatically shift all of the valves, leaving the other pipe for the operation of the brakes.

By my present improvements, however, the necessity for the use of a double line of pipe is avoided, and also greater security against the stoppage of a train by the bursting of a hose is insured. In the prior apparatus referred to the bursting of a hose in the line on one side of the train and afterward of a hose in the line on the other side would bring the train to a standstill in the case of automatic brakes. In the use of my present improvements several sections of hose might burst in a train of, say, ten cars without rendering the brakes inoperative and without applying the brakes upon the bursting of a hose.

I do not limit myself to the specific construction of valves and chambers illustrated, as it will be obvious that any form of valve which is adapted to be seated at each end of a limited longitudinal traverse, and a chamber suited to receive and admit of the proper movements and seating of said valve, and of the attachment of the hose-sections and brake-pipe would be the equivalents of the analogous devices hereinbefore described.

I claim herein as my invention—

1. In pipe-coupling apparatus, the combination, substantially as set forth, of a single line of pipes, double lines of flexible or hose connections uniting the adjacent members of said line of pipes, and valve mechanism controlling the communication between the pipes and the flexible connections.

2. The combination, substantially as set forth, of two or more sets of braking mechanism, each having a single line of brake-pipe, double lines of flexible or hose connections uniting the brake-pipes of the adjacent sets, and valve mechanism controlling the communication between the brake-pipes and said flexible connections.

3. In a brake apparatus, the combination, substantially as set forth, of a brake-pipe, a valve-chamber secured thereto and provided with two opposite passages or nipples for the attachment of hose-connections, and a valve moving freely in said chamber between the openings of said passages and adapted to seat upon and close either of said openings.

4. In a brake apparatus, the combination, substantially as set forth, of a single line of brake-pipes, valve mechanisms connected with the ends of the members of said line, a double line of flexible or hose connections uniting the adjacent valve mechanisms, and couplings connecting the sections of said hose-connections.

5. In a brake apparatus, the combination, substantially as set forth, of a valve-chamber having an end opening or passage for attachment to a brake-pipe, and two side passages or nipples for the attachment of hose connections, a valve moving freely in said chamber between seats in the openings of said passages, and a leakage port or passage past said valve.

6. In a brake apparatus, the combination, substantially as set forth, of two brake-pipes having valve mechanisms, as set forth, on their adjacent ends, a two-part coupling having a similar valve mechanism connected to each of its sections, and double lines of flexible or hose connections extending from the valve-chamber of each coupling-section to the valve-chamber of the adjacent brake-pipe.

In testimony whereof I have hereunto set my hand.

GEORGE WESTINGHOUSE, Jr.

Witnesses:
R. H. WHITTLESEY,
C. M. CLARKE.